US008775155B2

(12) United States Patent
Roth et al.

(10) Patent No.: US 8,775,155 B2
(45) Date of Patent: Jul. 8, 2014

(54) MACHINE TRANSLATION USING OVERLAPPING BIPHRASE ALIGNMENTS AND SAMPLING

(75) Inventors: Benjamin Roth, Saarbrücken (DE); Andrew R. McCallum, Amherst, MA (US); Marc Dymetman, Grenoble (FR); Nicola Cancedda, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 491 days.

(21) Appl. No.: 12/911,252

(22) Filed: Oct. 25, 2010

(65) Prior Publication Data

US 2012/0101804 A1    Apr. 26, 2012

(51) Int. Cl.
    *G06F 17/28* (2006.01)
(52) U.S. Cl.
    USPC .................. 704/2; 704/4; 704/5; 704/7; 704/8
(58) Field of Classification Search
    CPC . G06F 17/28; G06F 17/2809; G06F 17/2818;
        G06F 17/2827; G06F 17/2845; G06F 17/2854
    USPC ............................................. 704/2, 4, 5, 7, 8
    See application file for complete search history.

(56) References Cited

U.S. PATENT DOCUMENTS

| | | | |
|---|---|---|---|
| 5,768,603 A * | 6/1998 | Brown et al. ..................... 704/9 | |
| 6,182,026 B1 | 1/2001 | Tillmann et al. | |
| 6,304,841 B1 * | 10/2001 | Berger et al. ..................... 704/2 | |
| 6,917,936 B2 | 7/2005 | Cancedda | |
| 2004/0024581 A1 | 2/2004 | Koehn et al. | |
| 2004/0030551 A1 | 2/2004 | Marcu et al. | |
| 2005/0137854 A1 | 6/2005 | Cancedda et al. | |
| 2006/0190241 A1 | 8/2006 | Goutte et al. | |
| 2007/0150257 A1 | 6/2007 | Cancedda et al. | |
| 2007/0265825 A1 * | 11/2007 | Cancedda et al. ................. 704/2 | |
| 2008/0262826 A1 | 10/2008 | Pacull | |
| 2008/0300857 A1 | 12/2008 | Barbaiani et al. | |
| 2009/0175545 A1 | 7/2009 | Cancedda et al. | |
| 2010/0274552 A1 * | 10/2010 | Gao et al. .......................... 704/2 | |

OTHER PUBLICATIONS

McCallum, et al. "Factorie: Probabilistic programming via imperatively defined factor graphs," in Neural Information Processing Systems Conference (NIPS) (2009).
Wick, et al. "SampleRank: Learning Preferences from Atomic Gradients," NIPS WS on Advances in Ranking (2009).
Gale, et al. "A program for aligning sentences in bilingual corpora," *Computational Linguistics* 1991: 75-102 (1993).

(Continued)

*Primary Examiner* — Qi Han
(74) *Attorney, Agent, or Firm* — Fay Sharpe LLP

(57) ABSTRACT

A system and method for machine translation are disclosed. Source sentences are received. For each source sentence, a target sentence comprising target words is generated. A plurality of translation neighbors of the target sentence is generated. Phrase alignments are computed between the source sentence and the translation neighbor. Translation neighbors are scored with a translation scoring model, based on the phrase alignment. Translation neighbors are ranked, based on the scores. In training the model, parameters of the model are updated based on an external ranking of the ranked translation neighbors. The generating of translation neighbors, scoring, ranking, and, in the case of training, updating the parameters, are iterated with one of the translation neighbors as the target sentence. In the case of decoding, one of the translation neighbors is output as a translation. The system and method may be at least partially implemented with a computer processor.

23 Claims, 7 Drawing Sheets

(56) References Cited

OTHER PUBLICATIONS

Koehn, et al. "Moses: Open Source Toolkit for Statistical Machine Translation," Proceedings of the ACL 2007 Demo and Poster Sessions, pp. 177-180 (Jun. 2007).
Collins, "Discriminative training methods for hidden markov models: Theory and experiments with perceptron algorithms," in Proc. ACL-02 Conf. on Empirical Methods in Natural Language Processing, vol. 10, p. 8 (ACL 2002).
Crammer, et al., "Ultraconservative Online Algorithms for Multiclass Problems," J. Machine Learning Research, 3:951-991 (2003).
Dredze, et al. "Confidence-weighted linear classification," in Proc. 25th Int'l Conf. on Machine Learning, pp. 264-271 (ACM 2008).
Papineni, K., Roukos, S., Ward, T., and Zhu, W. J. (2002). "BLEU: a method for automatic evaluation of machine translation" in *ACL-2002: 40th Annual meeting of the Association for Computational Linguistics* pp. 311-318.
I.D. Melamed, "Models of translational equivalence among words," Computational Linguistics, 26(2):221-249 (2000).
R.C. Moore, "A discriminative framework for bilingual word alignment," in Proc. Conf. on Human Language Technology and Empirical Methods in Natural Language Processing, p. 88 (ACL 2005).
www.scala-lang.org—accessed Oct. 12, 2010.
Kschischang, F.R. "Factor Graphs and the Sum-Product Algorithm," IEEE Transactions on Information Theory, vol. 47, No. 2, (Feb. 2001).
www.code.google.com/p/factorie—accessed Sep. 1, 2010.
Rohaimanesh, et al. "Inference and Learning in Large Factor Graphs with Adaptive Proposal Distributions and a Rank-based Objective," CMPSCI Technical Report, UM-CS-2009-008, May 26, 2009.
Blunsom, et al. "A Gibbs Sampler for Phrasal Synchronous Grammar Induction," *Proceedings of the 47th Annual Meeting of the ACL and the 4th IJCNLP of the AFNLP*, Suntec, Singapore, Aug. 2-7, 2009, pp. 782-790.

Blunsom, et al. "Probabilistic Inference for Machine Translation," *Proceedings of the Conference on Empirical Methods in Natural Language Processing*, 2008, pp. 215-223.
Arun, et al. "Monte Carlo inference and maximization for phrase-based translation," Proceedings of the Thirteenth Conference on Computational Natural Language Learning (CoNLL), pp. 102-110, Boulder, Colorado, Jun. 2009.
Kääriäinen, M. "Sinuhe—Statistical Machine Translation using a Globally Trained Conditional Exponential Family Translation Model," in Proceedings of the 2009 Conference on Empirical Methods in Natural Language Processing, pp. 1027-1036, Singapore, Aug. 6-7, 2009.
U.S. Appl. No. 12/690,504, filed Jan. 1, 2010, Stymne, et al.
U.S. Appl. No. 12/814,657, filed Jun. 14, 2010, Hanneman, et al.
U.S. Appl. No. 12/427,149, filed Apr. 21, 2009, Dymetman, et al.
Venugopal, et al. "Training and evaluating error minimization rules for statistical machine translation" Proc. Paratext '05 Proc. of the ACL Workshop on Building and Using Parallel Texts, Jun. 29, 2005, pp. 208-215.
Blunsom, et al. "A discriminative latent variable model for statistical machine translation" Proc. of the ACL '08: HLT, Jun. 16, 2008, pp. 200-208.
Liang, et al. "An end-to-end discriminative approach to machine translation" Proc. of the $21^{st}$ Intl. Conf. on Computational Linguistics and $44^{th}$ Annual Meeting of the ACL, Jul. 2006, pp. 761-768.
Roth, et al. "Machine translation Using overlapping alignments and sample rank" Proc. of the AMTA 2010, The ninth conf. of the assoc. for machine translation in the Americas, Oct. 31, 2010, pp. 1-8.
Haddow, et al. "SampleRank Training for Phrase-based machine translation" Proc. of the $6^{th}$ Workshop on Statistical Machine Translation, Jul. 30-31, 2011, pp. 261-271.

\* cited by examiner

MACHINE TRANSLATION USING OVERLAPPING BIPHRASE ALIGNMENTS AND SAMPLING

BACKGROUND

The present exemplary embodiment is directed to the field of machine translation. It finds particular application in connection with the use of overlapping biphrases in alignments for phrase-based statistical machine translation systems.

Phrase-based statistical machine translation (SMT) systems employ a biphrase table or "dictionary" as a central resource. This is a probabilistic dictionary associating short sequences of words in two languages that can be considered to be translation pairs. The biphrase table is automatically extracted, at training time, from a large bilingual corpus of aligned source and target sentences. When translating from a source to a target language (decoding), the biphrase table is accessed to retrieve a set of biphrases, each of which includes a target phrase which matches part of a source sentence or other text string to be decoded. Traditional approaches to phrase-based machine translation use dynamic programming to search for a derivation (or phrase alignment) that achieves a maximum probability (or score), given the source sentence, using a subset of the retrieved biphrases. Typically, the scoring model attempts to maximize a log-linear combination of the features associated with the biphrases used. Biphrases are not allowed to overlap each other, i.e., no word in the source and target sentences of an alignment can be covered by more than one biphrase.

Typically, the source sentence is partitioned into spans of words, each span covered by a biphrase, which are then reordered. While this method performs fairly well in practice, there are several disadvantages to the conventional approach. First, finding the optimal partitioning of the source sentence and selection of biphrases can be done efficiently only if the global score is composed of several local scores. However, corresponding short-range Markov assumptions may be too limited to capture all dependencies of interest. Second, unrestricted reordering makes decoding NP-complete (i.e., lacking a rapid solution), and the search for a solution has to be approximated. This is conventionally achieved by beam-search techniques, which work by generating the target sentence from left to right. Such techniques have difficulty recovering from incorrect decisions taken early on in the process. Third, maximizing the joint probability of translation and an auxiliary (hidden) phrase alignment ("Viterbi decoding") is not necessarily an ideal objective when only the translation itself is of interest.

There remains a need for training and decoding methods that allow a richer representation of translation pairs and a more flexible search.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S. Pub. No. 2007/0265825, published Nov. 15, 2007, entitled MACHINE TRANSLATION USING ELASTIC CHUNKS, by Nicola Cancedda, et al.; U.S. application Ser. No. 12/690,504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.; U.S. application Ser. No. 12/814,657, filed on Jun. 14, 2010, entitled WORD ALIGNMENT METHOD AND SYSTEM FOR IMPROVED VOCABULARY COVERAGE IN STATISTICAL MACHINE TRANSLATION, by Gregory Hanneman, et al.

Methods for building libraries of parallel corpora from which bilingual dictionaries can be generated are disclosed, for example, in U.S. Pub No. 2008/0262826, published Oct. 23, 2008, entitled METHOD FOR BUILDING PARALLEL CORPORA, by Francois Pacull. Methods for filtering biphrases are disclosed in U.S. patent application Ser. No. 12/427,149, filed on Apr. 21, 2009, entitled BI-PHRASE FILTERING FOR STATISTICAL MACHINE TRANSLATION, by Marc Dymetman, et al.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 2009/0175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

BRIEF DESCRIPTION

In accordance with one aspect of the exemplary embodiment, a method for training a translation scoring model for a statistical machine translation system includes receiving a set of source sentences, each of the source sentences comprising source words in a source language. For each source sentence, a target sentence comprising target words in a target language which are translations of the source words is generated. A plurality of translation neighbors, each based on the target sentence, is generated. Each translation neighbor includes at least some of the target words of the target sentence. For each of the plurality of translation neighbors, a phrase alignment between the source sentence and the translation neighbor is computed. Each of the translation neighbors is scored with a translation scoring model, based on the computed phrase alignment between the source sentence and the translation neighbor. A plurality of the scored translation neighbors is ranked, based on the translation model scores. Parameters of the model are updated based on a comparison of the ranking with an external ranking of the plurality of translation neighbors. The method further includes iterating at least once more, the generating of translation neighbors, scoring, ranking, and updating parameters, wherein in the generating of the plurality of translation neighbors of the target sentence, the target sentence is a translation neighbor from a prior iteration.

In accordance with another aspect of the exemplary embodiment, a machine translation system includes memory for storing a set of source sentences, each of the source sentences comprising source words in a source language and memory storing instructions which for each source sentence, generate a target sentence comprising target words in a target language which are translations of the source words; generate a plurality of translation neighbors of the target sentence, each translation neighbor comprising at least some of the target words of the target sentence; for each of the plurality of translation neighbors, compute a phrase alignment between the source sentence and the translation neighbor; score each translation neighbor with a translation scoring model, based on the computed phrase alignment between the source sentence and the translation neighbor; rank a plurality of the translation neighbors based on the translation model scores; if the source sentences are being used for training the model, update parameters of the model based on a comparison of the translation model score-based ranking with an external ranking of the plurality of translation neighbors; iterate, at least once more, the generating of translation neighbors, scoring, ranking, and, in the case of training, updating the parameters, wherein in the generating of the plurality of translation neighbors of the target sentence, the target sentence is a translation neighbor from a prior iteration; if the source sentence is received for decoding, outputting a translation neighbor as a translation of the source sentence; and if the source sentence is received for training, storing the trained model generated in one of the iterations in memory. A processor in communication with the memory executes the instructions.

In accordance with another aspect of the exemplary embodiment, a method for machine translation includes receiving text to be translated comprising at least one source sentence, each of the source sentences comprising source words in a source language. For each of the at least one source sentence, the method includes generating a target sentence comprising target words in a target language which are translations of the source words. A plurality of translation neighbors of the target sentence is generated, each translation neighbor comprising at least some of the target words of the target sentence. For each of the plurality of translation neighbors, a phrase alignment is computed between the source sentence and the translation neighbor. Each translation neighbor is scored with a translation scoring model, based on the computed phrase alignment between the source sentence and the translation neighbor. A plurality of the translation neighbors is ranked, based on the translation model scores. The method further includes iterating, at least once more, the generating of translation neighbors, scoring, and ranking, wherein in the generating of the plurality of translation neighbors of the target sentence, the target sentence is a translation neighbor from a prior iteration. One of the translation neighbors is output as a translation of the source sentence based on the ranking.

DETAILED DESCRIPTION

Figure 1:
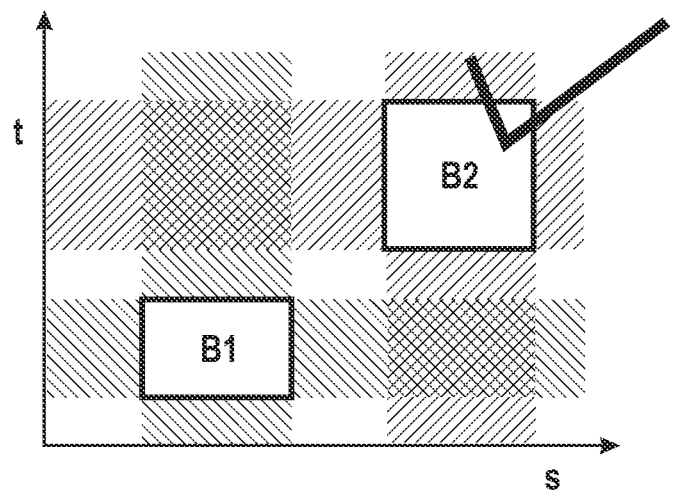
FIG. 1 is a graph of a source sentence and target sentence illustrating accepted biphrases in a first alignment.

The exemplary embodiment relates to a system and method for statistical machine translation which takes as input a source string, such as a sentence in a source language and outputs a translation string in a target language. The system utilizes a biphrase table of biphrases and a translation model which is trained with a training set of bi-sentences. The translation model is adapted to employ overlapping biphrases. Decoding and training are performed using a sampling approach on a set of feature functions (or simply, "features"), which may include a language model and a distortion model. In traditional phrase-based translation, decoding infers both a Viterbi alignment and the target sentence. By a Viterbi alignment, it is meant that biphrases in the final translation or in partial solutions (candidate alignments) are not permitted to overlap, and in the final solution, each word of the target sentence and each word of the source sentence is in exactly one biphrase.

In contrast to this rigid approach, the exemplary method disclosed herein produces a rich overlapping-phrase alignment by a fast deterministic method. Probabilistic decoding infers only the target sentence, which is then able to leverage arbitrary features of the entire source sentence, target sentence, and phrase alignment. Using a sampling method for learning enables an efficient estimation of potentially hundreds of thousands of parameters. Test-time decoding can be achieved, for example, with Markov-Chain Monte Carlo (MCMC) sampling, optionally with annealing.

A "biphrase," as used herein, is a pair of phrases (each phrase comprising a sequence of one or more words), one phrase from a source natural language and the other from a target natural language. Biphrases may be extracted by an automated system from a training corpus of bi-sentences which have been determined to be translations of each other in at least the source language to target language direction. For example a corpus of documents, such as those produced by the European parliament, that have been manually translated into multiple languages, may be used for automatic extraction of bi-sentences. A biphrase is generally one which has been observed in the training corpus of bi-sentences and which has one or more associated feature values determined on the basis of the training corpus. In general, biphrases include contiguous sequences of words.

A "biphrase table" includes biphrases extracted from a training corpus of parallel sentences, together with the computed values of one or more features of the biphrase. The biphrase features may include phrasal probabilities, i.e., the probability of finding the source phase in the presence of the target phrase in the training corpus, and vice versa, as well as lexical probabilities, which may be computed as a function of the probability of finding, within the training corpus, each word of the source phrase in the presence of each of its most probable corresponding target word(s) in the target phrase. The biphrase table need not be stored in the form of a table but can be stored in computer memory in any suitable accessible data structure.

Figure 2:
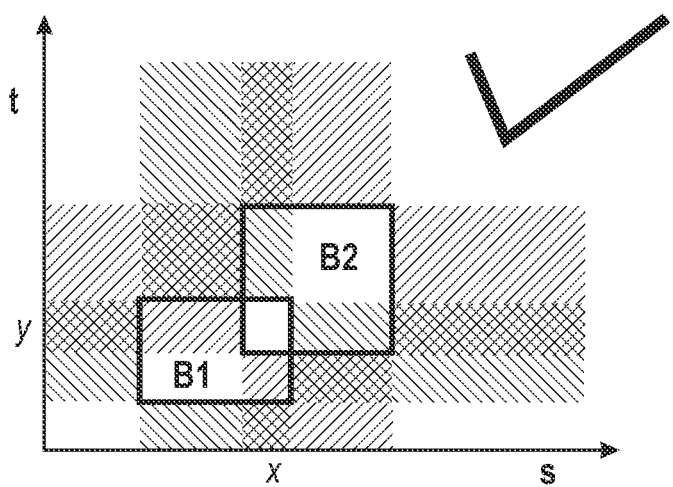
FIG. 2 is a graph of a source sentence and target sentence illustrating accepted biphrases in a second alignment.
Figure 3:
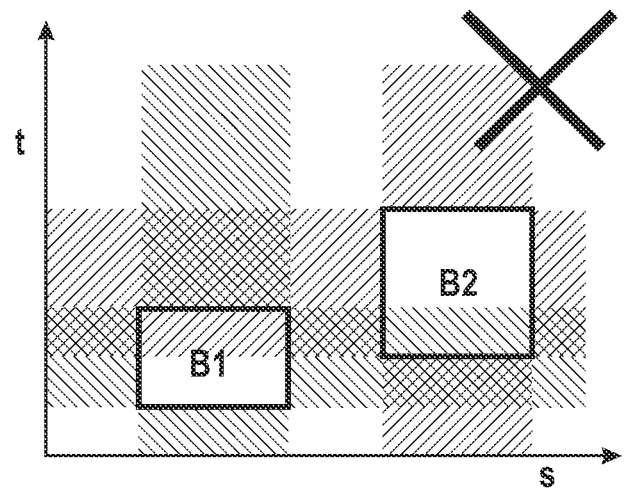
FIG. 3 is a graph of a source sentence and target sentence illustrating non-accepted biphrases.
Figure 4:
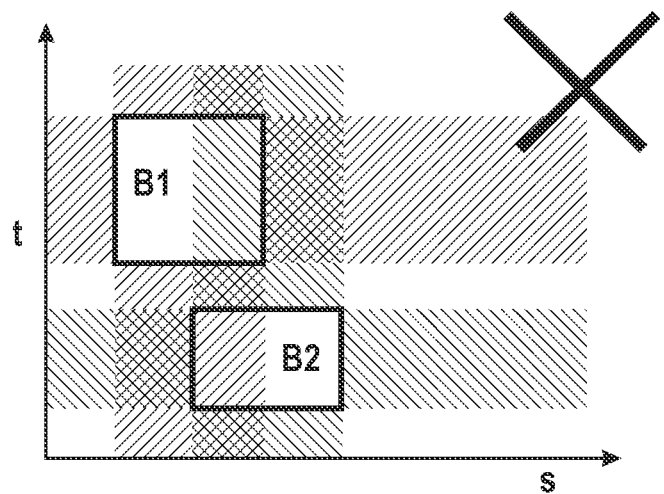
FIG. 4 is a graph of a source sentence and target sentence illustrating non-accepted biphrases.

The exemplary system and method accept what are referred to herein as "consistent overlapping biphrases" in an alignment. A pair of consistent overlapping biphrases in an alignment between a source string, such as a sentence, and a target string, such as a sentence, occurs when a word (or words) of the source or target string is covered by two (or more) biphrases in the alignment and wherein the two biphrases at least partially overlap each other, i.e. both cover a target sequence and a source sequence of one or more words which is the same for each biphrase. Other than this exception to the general case, words of the source sentence are not permitted to be in more than one biphrase in an alignment and similarly, words of the target sentence are not permitted to be in more than one biphrase in the alignment. These consistency requirements are illustrated in FIGS. 1-4. FIGS. 1 and 2 illustrate consistent pairs of biphrases and FIGS. 3 and 4 illustrate inconsistent pairs. Specifically, FIG. 1 shows an exemplary alignment between a source sentence s and a target sentence t. Two biphrases B1 and B2 are illustrated as rectangles, each one covering a respective sequence of words on the target sentence and a respective sequence of words in the source sentence (as will be appreciated, there may be many more such biphrases used in an alignment. In FIG. 1, the two biphrases are not overlapping biphrases since there is no sequence in either the target or source sides which is covered by two biphrases. They are thus consistent. In the case of FIG. 2, biphrases B1 and B2 are overlapping and satisfy the conditions for an overlapping biphrase, since there is a sequence x on the source side and a sequence y on the target side which are in both biphrases. They are also consistent. FIGS. 3 and 4 show two cases which do not constitute consistent overlapping biphrases since in the case of FIG. 3, while there is a target sequence y that belongs to both biphrases there is no source sequence x that also does, and in the case of FIG. 4 while there is a source sequence x that belongs to both biphrases there is no target sequence y that also does.

The exemplary translation model, which does not rely on a rigid partition in non-overlapping phrases, can be trained and used for inference in a sampling setup. By way of example, the model can be implemented using a probabilistic programming language, such as FACTORIE (See, A. McCallum, K. Schultz, and S. Singh, "Factorie: Probabilistic programming via imperatively defined factor graphs," in Neural Information Processing Systems Conference (NIPS) (2009)). This programming language facilitates learning and using probabilistic models, and in particular, those learned through factored graphs. In a factor graph, each factor is a relation (link in the graph) between two or more different objects which is given a probabilistic weight. In the present case, the objects are variables, such as sentence length, and the like.

Parameters (feature weights) of the exemplary translation model are learned with a sampling algorithm, such as SampleRank (See, M. Wick, K. Rohanimanesh, A. Culotta, and A. McCallum, "SampleRank: Learning Preferences from Atomic Gradients," NIPS WS on Advances in Ranking (2009)). The translation model can, in principle, incorporate arbitrary features of the translation pair of source and target strings. Decoding can be performed by a random walk with a sharpened (annealed) version of the learned translation model distribution. In the exemplary embodiment, the sampling approach is used as the training method for the translation model wherein features and the proposal steps depend on an overlapping alignment which is deterministically associated with every source-target sentence pair.

Figure 5:
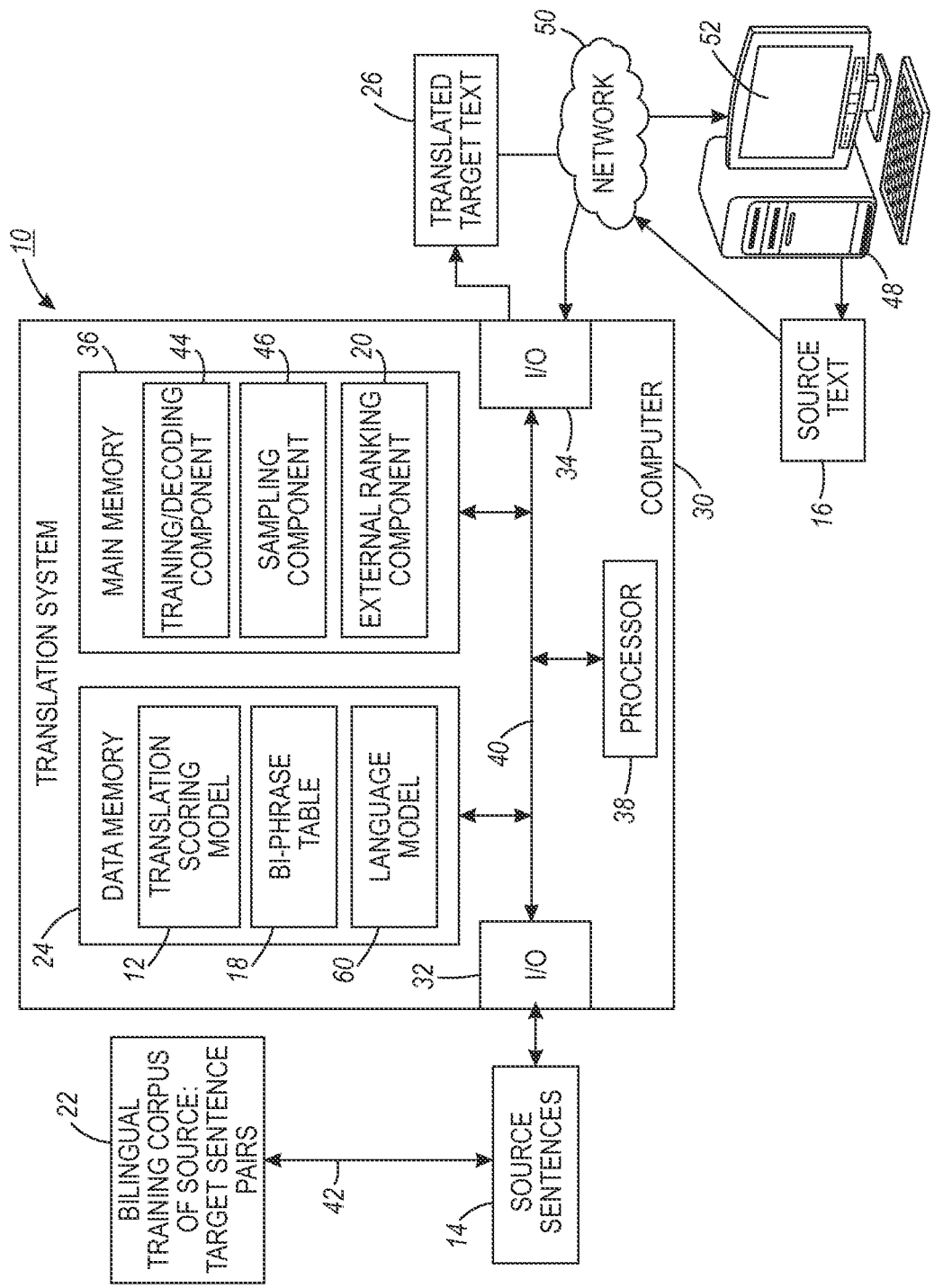
FIG. 5 is a functional block diagram of an environment in which a machine translation system operates in accordance with one aspect of the exemplary embodiment.
Figure 6:
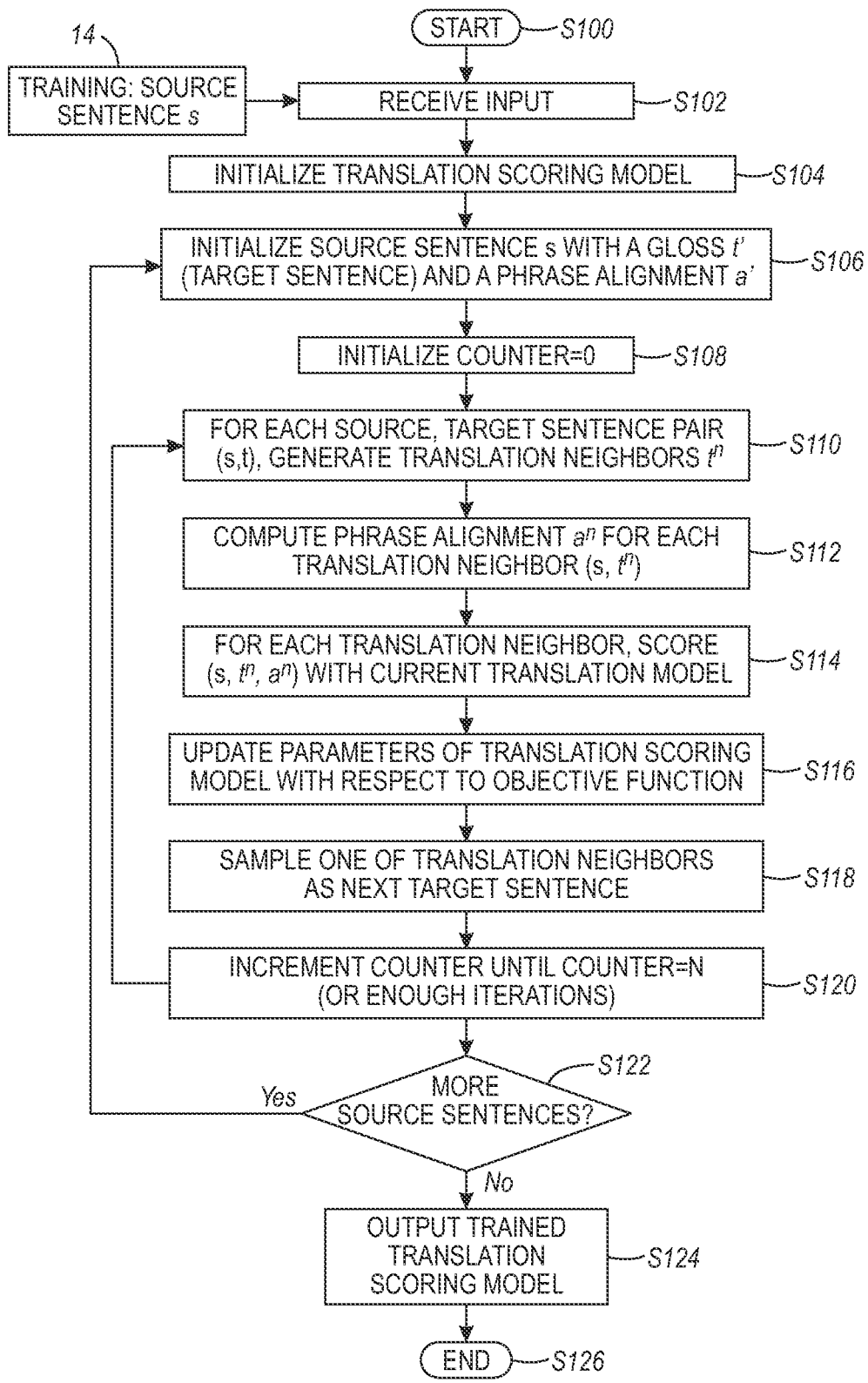
FIG. 6 is a flow chart illustrating a method for training a machine translation scoring model which may be implemented in the system of FIG. 5.
Figure 7:
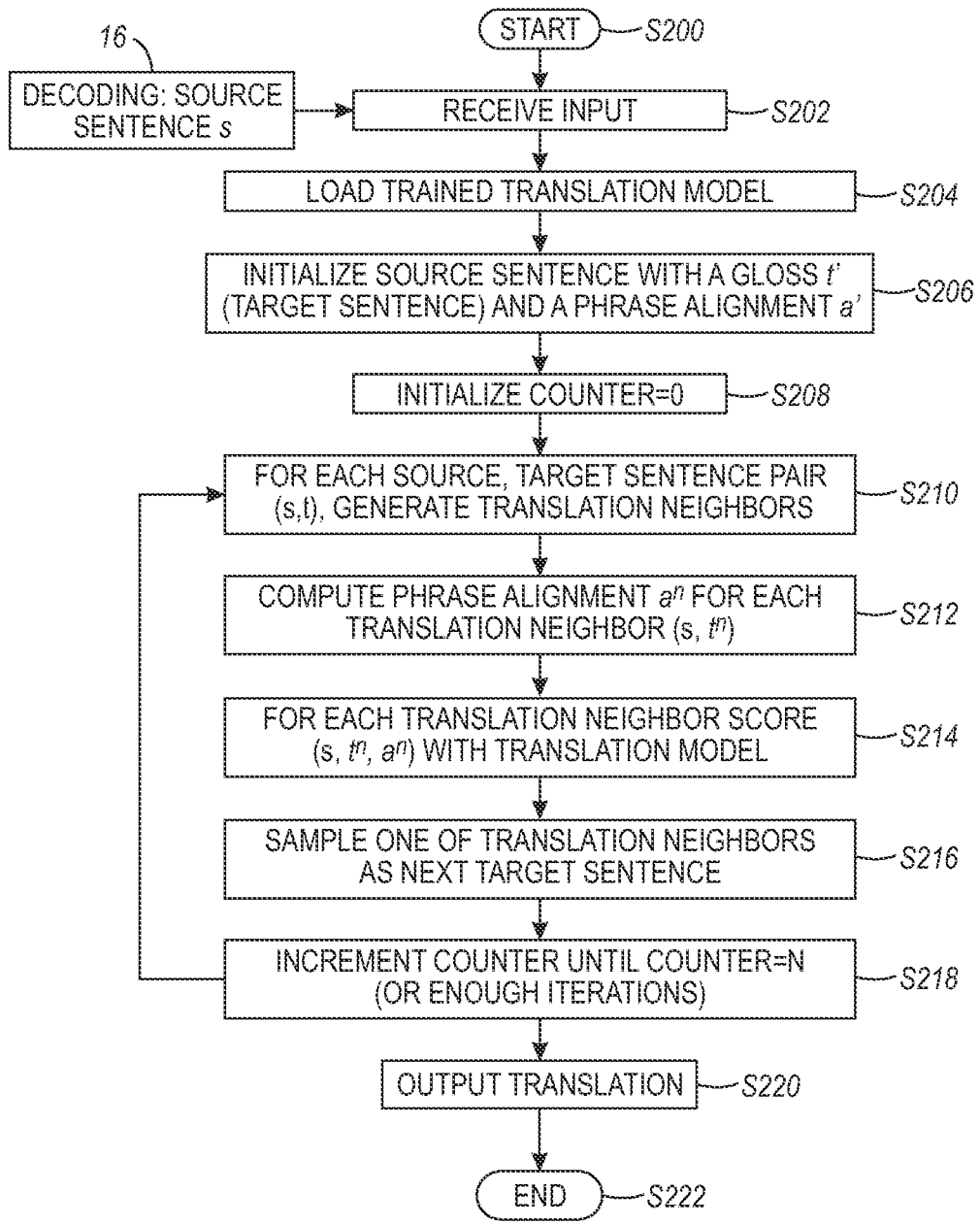
FIG. 7 is a flow chart illustrating a method for using the trained machine translation scoring model which may be implemented in the system of FIG. 5.

With reference to FIG. 5 a system 10 for training a translation model 12 and using such a trained translation model for decoding (translation of a source sentence) are illustrated. FIG. 6 is a flow chart which illustrates the training method. FIG. 7 illustrates a method for using the trained translation model to translate a source sentence (decoding). Since the two methods are similar in many respects, these will be described together, with differences noted.

The method begins at S100 (S200).

At S102 (S202) the system 10 is input with natural language text. In the case of training (S102), the system 10 takes, as input, a set 14 of source sentences s in the source language. The source sentences s may be obtained from a training corpus 22. In this case, each source sentence s has a corresponding sentence t in the target language, which has been determined to be a translation of the source sentence, at least in the source to target direction. These target sentences are used collectively in assessing translation quality, as described in greater detail below. In the case of decoding, the input at S202 is source text 16, which may include one or more source sentences s, to be translated by the trained translation model 12 into target sentences t in the target language. In both training and decoding, words (more generally, tokens) of the respective source sentence s are identified.

At S104 (S204), a translation scoring model 12 is provided. In the case of training of the model 12, parameters (feature weights) of the model are initialized at S104. If the task is decoding, a previously-trained translation scoring model 12 is loaded at S204. The features to which the parameters are applied may have been manually predefined.

At S106 (S206), each source sentence s is intialized with a gloss t', which serves as a first target sentence. This may involve choosing the most likely translation for each source word in the source sentence s. A phrase alignment a' is also computed for the source sentence s and its target sentence t'.

At S108 (S208), a counter may be initialized to provide for N iterations. N can be, for example, at least 10, e.g., at least 100, such as 1000, or more. A suitable value for N can be derived experimentally. Alternatively, the method may be stopped at a natural stopping point, e.g., when the iterations result in no significant improvements in scoring.

At S110 (S210), starting from the gloss t', an iterative MCMC sampling procedure is performed. Specifically, for each source sentence s, a set of translations t'' which are referred to herein as translation neighbors, is generated by changing the current translation t (which in the first iteration is t') according to a set of predefined neighborhood operators. Example operators are described below. Each of the translation neighbors t'' includes at least some (or all) of the target words of the target sentence t but differs from the target sentence in a minor way.

At S112 (S212), for each of the pairs (s, t''), its respective phrase alignment a'' is deterministically computed. This includes identifying a set of biphrases from the biphrase table 18, which each cover one or more of the source words and one or more of the target words. From these, a subset of the biphrases is identified in which each source word and each target word is in no more than one biphrase, except in the special case of consistent overlapping biphrases, as discussed above, in which case, a word or words may be in more than one biphrase.

Based on s, t and the phrase alignment a'', at S114 (S214) a score P(t|s) is computed for each translation neighbor t'' by the translation scoring model 12, which is the trained translation model in the case of decoding (S214) and the current translation model in the case of training (S114). In computing the score, a set of features is computed for the sentence pair (s, t), using the value of this alignment. Then the result is scored according to the current model 12. The translation neighbors can then be ranked, based on their scores.

In the training phase, at S116, an external ranking of the translation neighbors is also performed by an external ranking component 20 to determine whether the model parameters should be updated.

At S118 (S216), the next translation t is chosen from the set of neighbors t'' generated at S110 (S210). This can be achieved by "randomly" (probabilistically) sampling one of the translation neighbors with a probability of a translation neighbor being selected being proportional to the score P(t|s) that it was assigned by the translation model 12 at S114 (S214). In one embodiment, the selection method gives all (or at least a set of the most highly scoring) of the translation neighbors a probability that they will be chosen as the next translation t, with a greater probability that a high-scoring translation neighbor will be selected than a less highly-scoring one. As a minor modification, in training, the probability of selection could be based on updated scores produced by the updated model, rather than on the scores output before updating.

At S120 (S218), the counter is incremented. The method then returns to S110 (S210), where t is one of t''.

After N iterations, or at a natural stopping point, the results are output. If there are more source sentences (S122), however, the method is repeated from S106.

As will be appreciated, in an alternative embodiment, the loops in FIG. 6 can be reversed so that the parameters of the translation model are updated for all the training source sentences s before proceeding to the next iteration of the generation of translation neighbors (see Algorithm 1 below).

In the case of training (S124), the output of the method is the trained translation model 12, which is stored in memory 24. In the case of decoding, at S220 a translation 26 of the source sentence is output, which may be the highest scoring alignment generated in any of the N iterations.

The method ends at S126 (S222).

The method can be implemented in a single algorithm, or a separate algorithm for each of training and decoding. Algorithm 1 is illustrative of the procedure used for training and decoding. As will be appreciated from the foregoing, the methods for training and decoding need only differ in two places, which concern the loading and updating of the model parameters. Otherwise exactly the same code can be used.

---

Algorithm 1: Training and Decoding initialize each source sentence with gloss and alignment
if training then initialize model
if decoding then load model
for num N iterations do
   foreach sentence pair do
      generate translation neighbors
      compute alignments for translation neighbors
      score translation neighbors
      if training then
         update parameters w.r.t. objective function (e.g.,
         BLEU) using SampleRank
      end
      sample next translation from neighbors (proportional to
         score)
   end
end

---

The methods illustrated in FIGS. 6 and/or 7 may be implemented in a computer program product that may be executed on a computer. The computer program product may be a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method(s) may be implemented in transitory media, such as a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 6, FIG. 7, or both, can be used to implement one or both of the exemplary methods.

With reference once more to FIG. 5, the exemplary statistical machine translation system 10 may be embodied in a computing device or devices 30, including one or more input/output devices 32, 34, main memory 36, separate from or included in data memory 24, and a computer processor 38 communicatively with the memories 24, 36 via a bus 40.

In the training phase, a set of source sentences 14 may be input to the system from a parallel corpus 22. The exemplary corpus 22 may be stored in system memory 24 or in memory accessible thereto via a wired or wireless link 42, such as the Internet. The input sentences 14 may be stored in data memory 24 during training.

Main memory 36 of the computing device 30 stores software instructions 20, 44, 46 for performing the exemplary method(s), which in the illustrated embodiment include a combined training and decoding component 44, which implements the illustrated Algorithm 1. As will be appreciated, separate training and decoding components may alternatively be provided. A sampling component 46 is called upon by the training/decoding component to generate translation neighbors during the training and decoding process. The external ranking component 20 computes an objective function, such as the BLEU score.

In the illustrated embodiment, the system 10 is implemented in a server computer 30 which receives text 16 to be translated from a client computing device 48 (with corresponding memory and a processor) via a wired or wireless link 50, such as a local area network or wide area network, such as the Internet. A user may select the text 16 to be translated via a web browser on the client device. In other embodiments, the system 10 may be resident on the client computing device 48, particularly once the model 12 has been trained. As will be appreciated, the source text 16 may be acquired from a variety of external sources or generated on the computer 30 itself, and may be input to the system 10 by any appropriate input 34, such as via a modem, USB input, CD or DVD drive, or the like. The translated text may 24 be output by the system 10 to one or more of the client device 48, memory, a display screen 52 linked to computer 30 or client device 48, a printer (not shown), or any other suitable output device.

The digital processor 38 can be variously embodied, such as by a single-core processor, a dual-core processor (or more generally by a multiple-core processor), a digital processor and cooperating math coprocessor, a digital controller, or the like. The processor 38, in addition to controlling the operation of the computer, executes the instructions stored in memory 36 for performing the method outlined in FIGS. 6 and 7.

Memory 24, 36 may include, for example, read only memory (ROM), random access memory (RAM), flash memory, or any combination of the above as a single component or distributed components.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Further details of the exemplary system and method will now be discussed.

The Training Corpus

The training corpus 22 includes portions of text in each language that have been determined to be mutual translations of each other, or at least in the source to target direction. The text in the corpus 22 is aligned at the sentence level, i.e., each source sentence is matched with a corresponding target sentence as a sentence pair. Methods for automatically identifying sentences which are expected to be mutual translations of each other are well known. For example, two documents which are expected to be mutual translations are first aligned at the paragraph level, e.g., by considering the layout of the two documents. Then, within each aligned pair of paragraphs, the sentences can be aligned by considering various heuristics, e.g., the order, number of words, etc. All of this can be performed automatically by a suitable computer which includes a processor for executing the instructions. Methods for aligning sentences in parallel corpora are described, for example, in W. A. Gale and K. W. Church, A program for aligning sentences in bilingual corpora, *Computational Linguistics* 1991: 75-102 (1993). Methods for identifying parallel corpora are disclosed, for example, in U.S. Pub No. 20080262826, published Oct. 23, 2008, entitled METHOD FOR BUILDING PARALLEL CORPORA, by Francois Pacull.

Once a set of source sentences have been identified from the corpus 22, other preprocessing may be performed to filter out sentences which may be expected to contribute negatively to the system performance. Sentences which exceed a predetermined length may be filtered out. The remaining sentences, or a suitable set 14 thereof, are tokenized, i.e., each sentence (or more generally, a text string) is converted to a sequence of tokens. The tokens are primarily words but may also include other tokens, such as numbers and punctuation, e.g., periods and commas. Hyphenated or compound words may be extracted as a single token or processing may be performed to split them into shorter tokens with the appropriate structure for the language in question.

The Biphrase Table

The biphrase table 18 may be generated in any suitable manner as known in the art. For example, it may be extracted from the parallel corpus 22 by the heuristics employed in a standard run of the Moses pipeline (see, P. Koehn, H. Hoang, A. Birch, C. Callison-Burch, M. Federico, N. Bertoldi, B. Cowan, W. Shen, C. Moran, R. Zens, "Moses: Open Source Toolkit for Statistical Machine Translation," Proceedings of the ACL 2007 Demo and Poster Sessions, pages 177-180 (June 2007)). In such a method, the biphrase table is often obtained by first aligning a parallel corpus 22 at the level of the individual words. This alignment often relies on a tool called GIZA++. GIZA++ is a statistical machine translation toolkit that is used to train IBM statistical translation models (Models 1-5) and an HMM word alignment model. A further procedure then extracts phrase pairs (bi-phrases) and inserts them in the biphrase table, together with the appropriate corpus-wide frequency statistics. The biphrase table may be stored in memory 24 or may be otherwise made accessible to the system 10.

Initializing Source Sentence with a Gloss (S106, S206)

Figure 8:
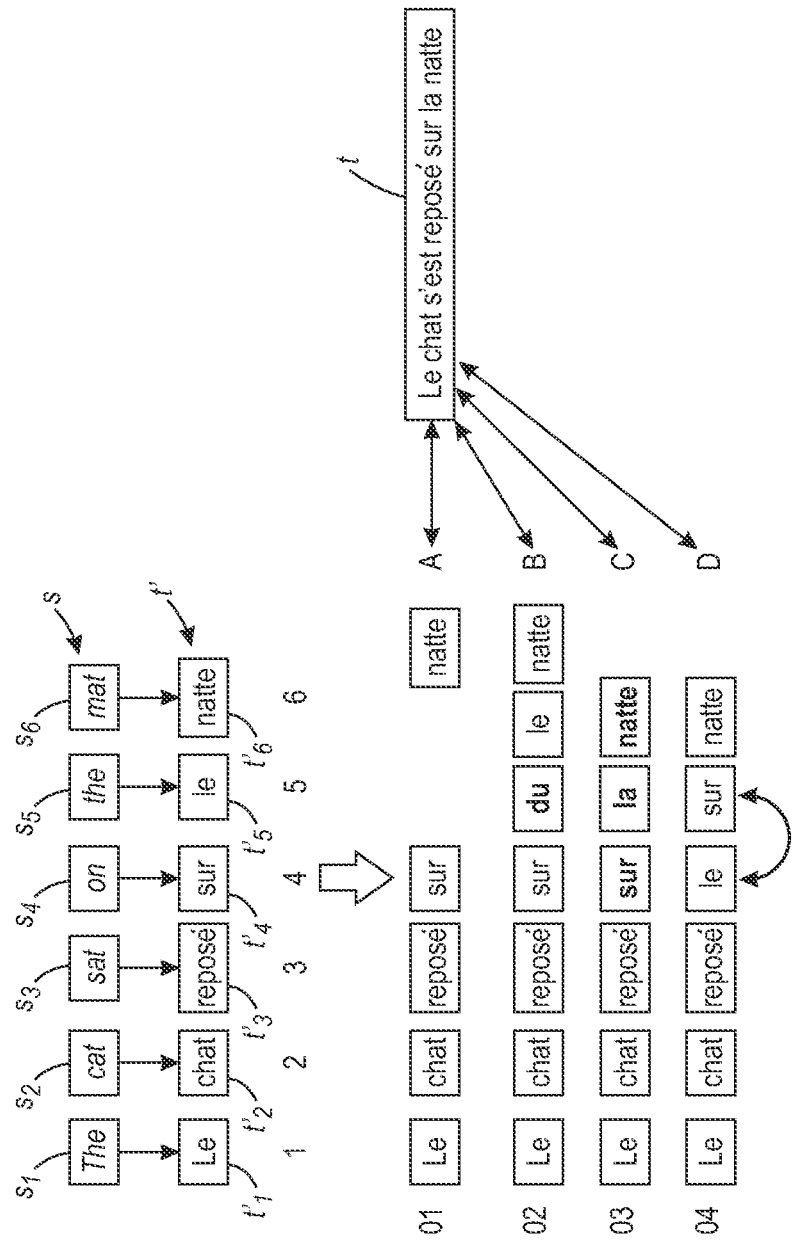
FIG. 8 graphically illustrates method for generating translation neighbors.

As illustrated in an example in FIG. 8, source words (or more generally, tokens) $s_1\ s_2\ s_3\ s_4\ s_5\ s_6$ of a source sentence s are translated to their respective target words, $t'_1\ t'_2\ t'_3\ t'_4\ t'_5\ t'_6$ of the gloss t'. This can be achieved by accessing the biphrase table 18 with each single source word, without reference to any of the other words in the source sentence s, and outputting the target language word(s) which is(are) its most frequent translation. Thus, for example, while the phrase the mat is frequently translated as la natte, in French, when each word is considered individually, the word the may be translated as the masculine form, ie. As will be appreciated, other ways for initializing the sentence with an approximate translation as a gloss are also contemplated. An alignment is also generated, which in this step may simply be the correspondence between source and target words in the order in which they were translated ($s_1$:$t'_1$, $s_2$:$t'_2$, $s_3$:$t'_3$, $s_4$:$t'_4$; $s_5$:$t'_5$, $s_6$:$t'_6$ in the case of the sentences in FIG. 8). Alternatively, the alignment may be computed as described for S112 below.

Initializing the Model (S104, S204)

The exemplary model 12 is a log-linear probabilistic model, as described in greater detail below. In the training phase, the parameters of the model (feature weights) may each be initialized with an equal weight or with any suitable value.

Scoring (S114, S214)

A target text sentence t is scored according to a "log-linear" model 12 which can be expressed in the form $P(t|s) \propto \exp(\Sigma_k \Theta_k \phi_k(s,t))$ where the $\phi_k(\bullet,\bullet)$ are features functions and each $\Theta$ is a vector of feature weights indexed by k, where k is the number of features. As noted before, s is the ("observed") source sentence and t is the ("unobserved") translation or target sentence. The normalized score gives an estimate $P(t|s, \Theta)$ of the probability of the unobserved variable t given the observed variable s.

In translation, the decoder attempts to find the translation string t and an alignment that maximizes the sum shown, and then outputs only the corresponding translation string t.

In the exemplary embodiment, e.g., using the Factorie toolkit as an implementation platform and its embedded SampleRank training algorithm, the features are modeled as a simple factor graph, in which each factor directly connects the nodes s and t″. This could, however, be extended to a more sophisticated graphical model.

In a training method, such as with SampleRank, the goal is to learn parameters $\Theta$ so that the model 12 agrees with the objective function 46 in ranking configurations. Candidates are taken from the translation neighbors and top-scoring candidates are compared. In the case of disagreement between the objective function and the model in ranking two candidates, a perceptron-style update of model parameters at iteration n is performed:

$$\Theta^{n+1} \leftarrow \Theta^n + \eta(\phi(s,\hat{t}) - \phi(s,t)),$$

where $\hat{t}$ is the candidate preferred over t by the objective function, and where $\eta$ is a learning rate. $\eta$ may be set manually or automatically to a suitable value.

The translation for the next iteration is sampled according to a transition distribution Q(t'|t), where t represents the current translation, at that iteration, and t' represents a translation to be used as t for the next iteration. In the exemplary case, Q(t'|t) is set to zero for translations not in the neighborhood of t (i.e., not among the translation neighbors of t), and proportional to the current learnt model probability P(t'|s,$\Theta$), otherwise (normalized by the sum of all neighbor probabilities). The neighborhood of t is computed by using neighborhood operators, as will be explained in further detail below.

Several of the possibilities provided by Factorie for setting the learning rate can be evaluated. For example, various machine learning algorithms, such as averaged perceptron (see, for example, M. Collins, "Discriminative training methods for hidden markov models: Theory and experiments with perceptron algorithms." in Proc. ACL-02 Conf. on Empirical Methods in Natural Language Processing, Vol. 10, p. 8 (ACL 2002), the Margin Infused Relaxed Algorithm (MIRA) (see, for example, K. Crammer and Y. Singer, "Ultraconservative Online Algorithms for Multiclass Problems," J. Machine Learning Research, 3:951-991 (2003)), and confidence weighted updates (see, for example, M. Dredze, K. Crammer, and F. Pereira, "Confidence-weighted linear classification," in Proc. 25th Int'l Conf. on Machine Learning, pp. 264-271 (ACM 2008)) can be used to determine a suitable learning rate. The averaged perceptron, which amounts to setting the learning rate to 1.0 and averaging the parameters over all iterations, has been found to work well in practice for a relatively small number (about 12) features. If many sparse features (e.g., one binary feature per biphrase) are employed, a confidence weighting scheme may be expected to perform better.

External Ranking of Translation Neighbors (S116)

During training, the ranking of a set of translation neighbors provided by the model 12 is compared with an external ranking of these translation neighbors which is not dependent on the model (S116). For example, an objective function is computed for scoring the translation neighbors t''. In particular, the objective function computing component 20 outputs a score for each translation neighbor, or for at least some of the translation neighbors, such as the ones most highly ranked by the current model 12. A ranking of some or all of the translation neighbors can thus be generated, based on the scores output by the objective function. The ranking of the translation neighbors output by the model 12 is compared with that output by the objective function 20. Then, if the model's ranking of two translation neighbors disagrees with the ranking given by the objective function component 20, the model parameters (feature weights) are updated using the perceptron-style update of model parameters described above. Otherwise, the parameters of the model are left the same.

An exemplary objective function which may be used at S116 for the external ranking is the BLEU score. In this embodiment, the objective function scores the current model translations relative to the training corpus 22 (FIG. 5). Thus, while the neighborhood is local (per-sentence), the objective function score is global (corpus-wide). This corresponds to a factor model of the corpus with shared parameters for sentence factors. For further details on the BLEU scoring algorithm, see, Papineni, K., Roukos, S., Ward, T., and Zhu, W. J. (2002). "BLEU: a method for automatic evaluation of machine translation" in ACL-2002: 40th Annual meeting of the Association for Computational Linguistics pp. 311-318. In other embodiments, the target sentence of the bisentence from which the source sentence was obtained is used as a reference translation for computing the external ranking. Another objective function which may be used is the NIST score.

Phrase Alignment (S112, S212)

A "phrase alignment" is a set of biphrases that express correspondences between spans of words in source and target sentences. A phrase alignment is used for two purposes: first, to compute features of the translation model used in scoring, and secondly, for constructing translation neighbors. Various methods for computing an alignment may be used herein. In the exemplary embodiment, the alignment is computed deterministically. For example, a greedy phrase alignment algorithm for computing an alignment between a source sentence and a target sentence is used (see, for example, I. D. Melamed, "Models of translational equivalence among words," Computational Linguistics, 26(2):221-249 (2000)).

In this method, biphrases that match on both source and target side are first identified from the biphrase table 18. Matching biphrases are biphrases which each include a source phrase that includes a span of one or more of the source words in s and a target phrase that includes a span of one or more target words in t. In some cases, one or both the sequences may be permitted to include gaps.

The retrieved biphrases are then ordered by a heuristic weight (which does not depend on the model 12). This biphrase weight expresses the strength of the biphrase as a whole, relative to the other biphrases which have been retrieved from phrase table, a higher weight representing a more frequent biphrase among the sentence pairs of the training corpus. For weighting the biphrases, a heuristic can be used which is similar to the conditional link probability scoring in R. C. Moore, "A discriminative framework for bilingual word alignment," in Proc. Conf. on Human Language Technology and Empirical Methods in Natural Language Processing, p. 88 (ACL 2005). However, in an exemplary embodiment, the weights are computed as follows: the phrasal and lexicalized biphrase probabilities $P_{lex}(b_s|b_t)$, $P_{phr}(b_s|b_t)$, $P_{lex}(b_t|b_s)$, and $P_{phr}(b_t|b_s)$ are first obtained from the phrase-table 18. These are multiplied and, additionally, the biphrase weights are normalized (using their geometric mean), in order not to penalize longer biphrases. This has also the effect of increased contiguity of alignments. The resulting biphrase weight is:

$$\sqrt[l_s]{P_{lex}(b_t|b_s)P_{phr}(b_t|b_s)} \times \sqrt[l_s]{P_{lex}(b_s|b_t)P_{phr}(b_s|b_t)}$$

where $P_{lex}(b_t|b_s)$ is the lexical probability which is the estimated probability of observing the individual words of target phrase $b_t$ of the biphrase b in a sentence t of a sentence pair in the training corpus given the individual words of the source phrase $b_s$ of the biphrase b in the source sentence s of the sentence pair. $P_{phr}(b_t|b_s)$ is the phrasal probability which is an estimate of the probability of observing the entire phrase $b_t$ in a target sentence t in the training corpus given the entire phrase $b_s$ in the source sentence s of a sentence pair. Similarly, $P_{lex}(b_s|b_t)$ is the lexical probability of observing the individual words of $b_s$ in a source sentence s in the training corpus the presence of the individual words of $b_t$ in t, and $P_{phr}(b_s|b_t)$ is phrasal probability of observing the entire phrase $b_s$ in s given the entire phrase $b_t$ in t, $l_s$ is the length of the source phrase and $l_t$ is the length of the target phrase. All of these probabilities and lengths are stored in the biphrase table 18 and may be extracted from the training corpus with the Moses pipeline, discussed above.

Finally, biphrases are added to the alignment set, in descending order of their biphrase weight (as computed above), if they are consistent with the current alignment set. By consistent, it means that they do not overlap any of the already added biphrases or that they satisfy the requirements for a consistent overlapping biphrase, as discussed above. Consistency thus allows for overlapping biphrases. Two (alignment) biphrases are consistent if the matching criterion is the same for source and target side, otherwise they are inconsistent. Existence of (partial) overlap is used as the matching criterion. A biphrase is consistent with an alignment set, if it is consistent with all biphrases in this set.

Thus, biphrases are added in sequence to the alignment, according to their biphrase weight, until no more biphrases are found which meet the consistency requirements.

The phrase alignment is then output which identifies the links between source words of s and target words of t. The phrase alignment is used in computing the score of translation neighbors and may also be used to identify translation neighbors, as discussed below.

For biphrases of more than one word, an internal alignment can also be identified. This may be retrieved from the biphrase table 18 and links each word on the source side of the biphrase with its corresponding word(s) on the target side of the biphrase.

Neighborhood Operators for Generation of Translation Neighbors (S110, S210)

The sampling component 45 produces a set of neighbor translations by using a set of operators which are designed to perturb the current target sentence slightly, by making small changes to it, for example by performing one or more of inserting words, removing words, inserting words, reordering the words, and replacing words. The samples produced in this way are thus not based on the objective function or translation model score. As an example, four operators (O1, O2, O3, and O4) are used to generate translation neighbors for the current translation t. Examples of the application of these operators are shown in FIG. 8. Each word of the translation neighbor (target sentence) is given a position number which is the order of the words in the sentence.

O1. Remove: For each target position, the word at this position is removed. In FIG. 8, the word of the target sentence t' at position 5 is removed to generate a translation neighbor A. This is repeated for each target position to generate a set of six translation neighbors.

O2. Insert: For each target position, if the n-gram (e.g., trigram) ending at this position is not present in the n-gram language model 60, a (random) word is inserted according to the language model. As will be appreciated, many biphrases are extracted as trigrams (sequences of three words), and these may be stored in a trigram language model 60 which may be part of the biphrase table. In the example in FIG. 8, in the case of position 5, assume that the trigram language model does not include the three word sequence repose sur le. In this case, the third word of a trigram which begins with repose sur is inserted before the word which is in position 5. In the illustrated example, the word du has been inserted, based on finding a trigram reposé sur du. The inserted word can be selected probabilistically based on the probability of its trigram in the language model. In one embodiment, the selection of insert words may be further limited to those which also are found in the biphrase table in a biphrase with one of the source words in the source sentence.

This insertion process can be repeated for each target position, each time potentially generating another translation neighbor. For words at the beginning of the target sentence, which have no actual trigram in the sentence, these words can either be ignored for this operator or a method for artificially generating a trigram can be used, which may include substituting word(s) from elsewhere in the sentence.

O3. Replace: A span of words on the target side of the sentence pair is replaced by a span of words which is derived from a biphrase which includes a sequence of the source side words. The number of translation neighbors added by the replace operator can be set to the number of words in the source sentence. The following mechanism can be used for this. First, a biphrase is sampled randomly (e.g., probabilistically, according to some biphrase weighting method, such as the one described above) out of all biphrases that can match somewhere on the source side of the sentence pair. In the exemplary embodiment, such a biphrase can thus be one which does not match anywhere on the target side. Then, the first and last positions of the match on the source side are mapped onto positions of the target side, following the internal word alignment of the highest weighted biphrases from the previous alignment. If no word alignment is available at these positions, a mapping is done along the sentence diagonal. The span of the target sentence identified by this mapping is replaced by the target side of the sampled biphrase.

Figure 9:
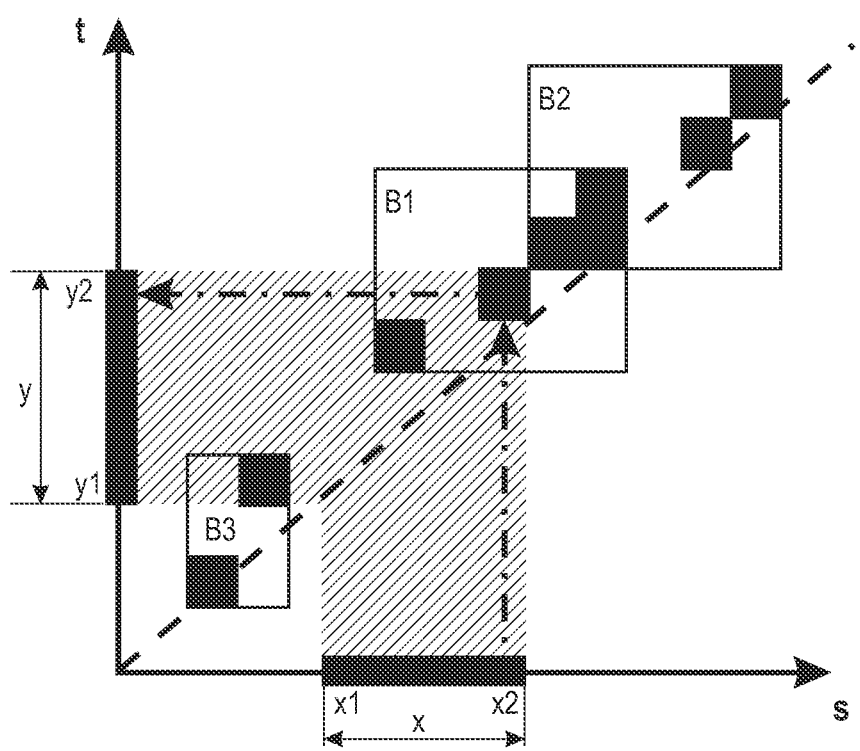
FIG. 9 illustrates a partial phrase alignment between a target sentence and a source sentence being used for generating a translation neighbor.

This process is illustrated schematically in FIG. 9. The rectangles B1, B2, B3 represent biphrases which are sized to just encompass all the words which they contain on the source and target sides. The black rectangles represent words which are internally mutually aligned in the biphrase. As will be appreciated, with consistent overlapping biphrases being permitted, there will generally be many more biphrases in the alignment than those shown, e.g., 50 or 100 biphrases. Here a source sequence x is selected for the replacement operation which is in a biphrase in the biphrase table. In this example, there happens to be no biphrase in the last alignment which covers all the words in x. Thus, a span of words y in t is artificially identified which has a probability of corresponding to x. For example, a biphrase B1 is identified which covers the last word x2 in x. From the internal (word) alignment in B1, this word is mapped to the target side at position y2. This then becomes the end position of the replacement span. There is no corresponding biphrase for the first word x1 in x so the first word x1 in x is mapped to the point at the corresponding relative position y1 on the target side. Then, the span of words from y1-y2 is replaced with the target side of the selected biphrase. As will be appreciated, other methods for identifying a replacement sequence of words which may be based, at least in part, on the source words, may alternatively be used.

In FIG. 8, for example, a biphrase which includes the words on the mat is identified, which has, as its target side, sur la natte. The first and last positions of this biphrase, on the source side, are positions 4 and 6. Assuming that these positions map to positions 4 and 6 on the target side, then the target span 4-6 is replaced with the target side of the biphrase.

O4. Shift: The target side of a random biphrase in the alignment is shifted to all possible positions. For example the word le is shifted to position 4 to generate translation neighbor D in FIG. 8.

In total, the use of these four operators amounts to a number of operations which is about four times the length of the source sentence per iteration (in FIG. 8, this gives about 4×6=24 translation neighbors).

All operators influence only the target side and do not directly change the phrase alignment but rather trigger changes to it, since the alignment follows deterministically from a sentence pair.

Feature Functions

The exemplary features used in the translation scoring model 12 can be directly expressed as features $\phi(s,t)$ of a sentence pair, since all other sources of information (e.g., alignments) are deterministically computed from this sentence pair. The exemplary features can be grouped into length features, a trigram language model feature, a distortion feature, and biphrase and alignment features.

Length Features:

1. The bare target length (number of words in t) is used as a feature in order to counteract a potential length bias of other features.

2. The relative length difference between target and source is used as a feature in order to control length variation between the two languages. This feature can be computed as:

$$\left(1 - \frac{l_t}{l_s}\right)^2,$$

Where $l_s$ and $l_t$ and are the lengths (in words) of source and target sentences, respectively.

Language Model Feature:

3. This feature is computed as the mean of the trigram (n-gram) log-probabilities of the translation (that is, sum of these log-probabilities normalized by the length of the target). Specifically, each word in the target sentence is considered as part of a trigram, even the first and second words, where artificial trigram probabilities are used. Each trigram's log probability is then found in the language model 60 and the sum of these probabilities is computed, which may be divided by the number of words in the target sentence.

Distortion (or Reordering) Feature:

4. The distortion feature is computed as follows: For each alignment biphrase the actual positions of its start and end point on the target side are compared to the projection of these points from the source side along the sentence diagonal. The distortion feature is the average distance between this projection and the actual position. This feature gives an overall estimate of how far the order of the target phrases differ from the order of the source phrases to which they are aligned.

Alignment Features:

Several features are computed from the inferred phrase alignment. These can include:

5. The number of biphrases in the phrase alignment.

6-9. The sum of alignment biphrase probabilities for each of $P_{lex}(b_s|b_t)$, $P_{phr}(b_s|b_t)$, $P_{lex}(b_t|b_s)$, and $P_{phr}(b_t|b_s)$ (this gives one feature for each direction, for lexical and phrasal), or their logs. Thus for example, in the case of $P_{lex}(b_s|b_t)$, the sum of this value for all the biphrases in the alignment is taken as a feature.

10. The sum of alignment biphrase weights. These biphrase weights are computed as described above.

11-12. The number of unaligned source (target) words (words which have no biphrase which covers that word in the alignment).

Implementation in Factorie

The exemplary translation model 12 uses the Factorie toolkit (see McCallum et al.), a library implemented in the Scala programming language (see, www.scala-lang.org) for performing learning and inference (here, translation) with arbitrary factor graphs. With Factorie, features need not be stored or represented in a particular form (e.g., expanded as vectors), but can be extracted at runtime as necessary. Changes to a variable-value configuration (a translation corresponds to an assignment to unobserved variables) are represented efficiently by differences (DiffList's) to the preceding configuration. This has the advantage that for sampling, several alternatives can be evaluated and scored with little overhead. In learning, only weights of factors that are affected by a particular change need to be updated.

In Factorie, a Variable stores everything that changes and is used for the exemplary features. In the translation model there are Variables for the target sentence and the source-target sentence pair. For example, one variable may be the length of the source sentence, and so forth. The links between these variables, which are predefined by a user, are the factors that are exploited by the method. These links are relatively sparse, i.e., each variable is connected with a minor subset of the variables. Any change to a Variable is reflected by a Diff. A Diff is an object that implements "do" and "undo" methods for efficiently controlling the change. In addition, it stores which Variable is affected. Diffs add themselves to a DiffList which keeps track of consecutive changes. For example, removing a word from a target sentence adds Diffs that capture:

1. Addition (removal) of biphrases that become (cease to be) part of the cover. (The cover is the set of all biphrases from the phrase table that match on the source and the target side).

2. Addition (removal) of target tokens (Diff for TokenVariable).

3. Updating of the phrase alignment to account for a modified target sentence-addition and removal of biphrases with respect to the new and old phrase alignments.

Templates are defined between types of Variables. When a variable of the respective type is changed, they gather statistics (feature values) and return the involved factors of the factor graph. Finally, a Model is a set of Templates. Once all the components are defined, training the machine translation model 12 can be performed in just a few lines of code, e.g.:

1. Initialize the sampler:

```
new  TranslationRandomSampler(model,  objective)
with SampleRank
```

2. Iteratively process sentence pairs:
sampler.process(pair)

The methods for training and using the machine translation model disclosed herein can thus be implemented from scratch in a just a few hundred lines of code. The exemplary translation system allows great freedom with respect to feature design and search operations. Both training as well as decoding can be performed with the same algorithm. The use of overlapping alignments emphasizes the freedom gained in modeling. It allows more exotic features, long range dependencies and settings with many more weights to be estimated to be incorporated into such a model without changing its basic principles. It thus provides a tool for evaluating new set ups that do not fit in any of the traditional settings.

Decoding

As noted above, decoding can be performed substantially as described for the training stage, except for the updating of the model 12. Minor variations are contemplated. For example, decoding with trained model 12 can be performed in an annealing setup. In this embodiment, the model probability P(t|s) used for sampling the next successive translation neighbor is taken to an exponent resulting in $$P(t|s)^{\frac{1}{\alpha}}$$

with the $\alpha$ ("temperature") in the exponent decreasing over time according to a rate factor. The temperature $\alpha$ is initially set to an initial value greater than 1, e.g., 100 and the rate factor to a value less than 1, e.g., 0.9, i.e., α is multiplied by 0.9 for the next and each subsequent iteration. As a result, the exponent increases over time, which has the effect of making the choice of the candidate target for the next iteration more and more likely to fall on the neighbor with the largest model probability, rather than on a neighbor with a smaller model probability. Thus, in the first iterations, while the temperature is still high, the choice of the next target sentence has a tendency to be highly "exploratory" and to accept changes that may not look locally optimal from the viewpoint of the model, but which may globally lead eventually to better translations, while during later iterations, the choice of the next target has a tendency to be more "conservative" and to focus more on changes that improve the model score locally.

In translation, the output of the decoding method may be the highest scoring translation neighbor from all the iterations as the translation of the source sentence. Of course, if the gloss happens to have the highest score, it may be the translation which is output.

Without intending to limit the scope of the exemplary embodiment, the following example demonstrates an application of the exemplary method.

EXAMPLE

The WMT08-Europarl training set is used for the heuristic extraction of biphrases, the corresponding development set for estimating the feature weights (training), and 250 sentences of the test set for evaluation (decoding). The model is trained using SampleRank with averaged perceptron. The training sampling is run for 1000 iterations (corresponding to about 100,000 proposals per sentence).

Decoding with trained model 12 is performed in an annealing setup, i.e. the model probability P(t|x) used for sampling the next successive translation is taken to an exponent resulting in $$P(t\mid s)^{\frac{1}{\alpha}}$$

with the factor α decreasing over time according to a rate factor. α is initially set to 100 and the rate factor to 0.9, i.e., α is multiplied by 0.9 for the next and each subsequent iteration. It is observed that after about 50 iterations (5000 translation neighbor proposals), the objective score oscillates around the same value and the algorithm can be stopped. Evaluation is done on the lowercased and tokenized outputs of three methods: the gloss with which the translation was initialized, the result of the sampling method, and the output of a conventionally trained Moses model. BLEU and NIST scores are given for the translations.

TABLE 1

Evaluation results on the WMT08 subset

| Method | BLEU | NIST |
|---|---|---|
| gloss | 0.1039 | 4.5052 |
| sampling | 0.2213 | 5.6124 |
| Moses | 0.3023 | 6.3983 |

Table 1 shows that the exemplary sampling method can achieve a good improvement over the baseline with a gloss initialization, but not as good as the performance of a mature machine translation system, such as Moses.

Table 2 shows example translations generated by initializing the sampling component 45 with maximal per-word phrase translation. A translation output using Moses is also shown, as well as the reference translation (what a human translator could provide). Obvious errors are underlined, omissions indicated by ø.

TABLE 2

| Source | furthermore, there are six basic aspects which worry us because of the method employed. |
|---|---|
| Gloss | en outre, il y <u>sont</u> six <u>de base</u> aspects qui <u>vous inquietez</u> nous <u>parce que de</u> la méthode <u>employées</u> . |
| Sampling | en outre, il y a six <u>les</u> aspects ø qui inquiètent nous à cause de la méthode ø. |
| Moses | en outre, il y a six aspects fondamentaux qui nous <u>inquiete parce que</u> la méthode utilisée. |
| Reference | en outre, six autres questions de fond nous préoccupent à cause de la méthode suivie. |

In contrast to Moses, the exemplary sampling model produces omissions of words that are actually contained in the phrase-table and also usually translated. This is related to the fact that the overlapping alignments are not hard-constrained to cover all source words (as is implicitly enforced with the alignments used by Moses). In some cases, this lack of a hard constraint is advantageous, as when some function words are better omitted in translation, but can be detrimental with content words. Optionally, the translation model 12 could be adapted to incorporate different factors accounting for the two types of omissions.

It is to be expected that with some readily implemented modifications, such as in the selection of operators and features, the exemplary statistical machine translation system can output improved results. By modifying the operators, a set of operators that is most beneficial to the overall translation score could be identified. For example, the insert operator could be modified to take into account the source side. Additionally, the example used a restricted set of 12 features, whereas the SampleRank algorithm could be employed to easily learn many thousands of feature weights, even to the degree that every biphrase is regarded as a feature itself. Factorie is easily able to handle a more sophisticated graphical model structure.

Some advantages of the approach are as follows. The sampling technique intrinsically allows the use of non-local features, as opposed to the traditional decoding techniques based on beam-search dynamic programming. Learning based on probabilistic samples (translation neighbors) goes beyond n-best lists typically used for training translation systems. Samples are more diverse than the n-best lists that tend to concentrate on candidates that are similar to each other and they represent the underlying probabilistic model more accurately than n-best lists. Built-in primitives in FACTORIE provide facilities for easily adding factors and for experimenting with different variants of inference and training.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A method for training a translation scoring model for a statistical machine translation system, comprising:
  receiving a set of source sentences, each of the source sentences comprising source words in a source language;

for each source sentence, generating a target sentence comprising target words in a target language which are translations of each of the source words in the source sentence;

after generating the target sentence, generating a plurality of translation neighbors based on the target sentence, each translation neighbor comprising at least some of the target words of the target sentence;

for each of the plurality of translation neighbors, computing a phrase alignment between the source sentence and the translation neighbor;

scoring each translation neighbor with a translation scoring model, based on the computed phrase alignment between the source sentence and the translation neighbor;

ranking a plurality of the translation neighbors based on the translation model scores;

updating parameters of the translation scoring model based on a comparison of the ranking based on the translation model scores with an external ranking of the plurality of translation neighbors; and iterating, at least once more, the generating of translation neighbors, scoring, ranking, and updating the parameters of the translation scoring model, wherein in the generating of the plurality of translation neighbors of the target sentence, the target sentence is a translation neighbor from a prior iteration;

wherein at least one of the generating of translation neighbors, scoring, ranking, and updating parameters is performed with a computer processor.

2. The method of claim 1, wherein the generating of translation neighbors comprises applying a set of operators to the target sentence, each of the operators generating at least one translation neighbor from the target sentence.

3. The method of claim 2, wherein the set of operators includes at least one of:

a remove operator which removes at least one target word from the target sentence;

an insert operator which inserts a word in the target sentence when a sequence of n words in the target sentence is not found in a language model;

a replace operator which replaces at least one of the target words in the target sentence with target words of a biphrase which matches at least one of the source words in the source sentence; and a shift operator which shifts a position of a target word to at least one different position in the target sentence.

4. The method of claim 1, wherein the computing of the phrase alignment between the source sentence and the translation neighbor comprises identifying a set of biphrases which cover, at best, all source words of the source sentence and all target words of the translation neighbor, each biphrase in the set including a sequence of the source words and a sequence of the target words.

5. The method of claim 1, wherein the parameters are feature weights of a log-linear probabilistic model of the form $P(t|s) \propto \exp(\Sigma_k \Theta_k \phi_k(s, t))$ and wherein the translation scoring model outputs a score for a translation neighbor which is a function of the expression $\exp(\Sigma_k \Theta_k \phi_k(s, t))$, where each $\phi_k(s, t)$ represents a feature which is a function of the source sentence s and the translation neighbor t and $\Theta$ represents a vector of the feature weights indexed by k.

6. The method of claim 5, wherein at least one of the features is based on the computed alignment.

7. The method of claim 1, wherein the external ranking of the plurality of translation neighbors comprises computing an objective function for each of the plurality of translation neighbors using a training corpus of sentence pairs, each sentence pair comprising a first sentence in the source language and a second sentence in the target language.

8. The method of claim 1, wherein the external ranking comprises computing the Bleu score for each of the plurality of translation neighbors.

9. The method of claim 1, wherein in the iteration, the target sentence is selected probabilistically from a set of the translation neighbors from the prior iteration where each of the translation neighbors in the set has a probability of being selected which is a function of its score assigned by the translation model.

10. A method for training a translation scoring model for a statistical machine translation system, comprising:

receiving a set of source sentences, each of the source sentences comprising source words in a source language;

for each source sentence, generating a target sentence comprising target words in a target language which are translations of the source words;

generating a plurality of translation neighbors based on the target sentence, each translation neighbor comprising at least some of the target words of the target sentence;

for each of the plurality of translation neighbors, computing a phrase alignment between the source sentence and the translation neighbor using biphrases identified from a biphrase table, the identified biphrases each including a source phrase that includes a span of one or more of the source words in the source sentence and a target phrase that includes a span of one or more target words in the translation neighbor, wherein in the phrase alignment, consistent overlapping biphrases are permitted, whereby each source word and each target word is covered by no more than one of the biphrases or is covered by consistent overlapping biphrases, each of the consistent overlapping biphrases being an identified biphrase which covers a same target word and a same source word as the other consistent overlapping biphrase in the phrase alignment;

scoring each translation neighbor with a translation scoring model, based on the computed phrase alignment between the source sentence and the translation neighbor;

ranking a plurality of the translation neighbors based on the translation model scores;

updating parameters of the model based on a comparison of the ranking based on the translation model scores with an external ranking of the plurality of translation neighbors; and iterating, at least once more, the generating of translation neighbors, scoring, ranking, and updating parameters, wherein in the generating of the plurality of translation neighbors of the target sentence, the target sentence is a translation neighbor from a prior iteration;

wherein at least one of the generating of translation neighbors, scoring, ranking, and updating parameters is performed with a computer processor.

11. A system for performing the method of claim 1 comprising memory which stores instructions for performing the method and a processor in communication with the memory which executes the instructions.

12. A computer program product comprising non-transitory media encoding instructions which when executed by a computer, perform the method of claim 1.

13. A method for machine translation comprising:
with a translation scoring model trained by the method of claim 1, translating text comprising at least one source sentence in the source language.

14. The method of claim 13, wherein the translation of the text comprises:
for each of the at least one source sentence, generating a target sentence comprising target words in a target language which are translations of the source words;
generating a plurality of translation neighbors of the target sentence, each translation neighbor comprising at least some of the target words of the target sentence;
for each of the plurality of translation neighbors, computing a phrase alignment between the source sentence and the translation neighbor;
scoring each translation neighbor with a translation scoring model, based on the computed phrase alignment between the source sentence and the translation neighbor;
ranking a plurality of the translation neighbors based on the translation model scores;
iterating, at least once more, the generating of translation neighbors, scoring, and ranking, wherein in the generating of the plurality of translation neighbors of the target sentence, the target sentence is a translation neighbor from a prior iteration; and
outputting a translation neighbor as a translation of the source sentence based on the ranking.

15. The method of claim 14, wherein at each iteration the target sentence is probabilistically selected from translation neighbor from prior iterations by annealing the scores of the translation neighbors according to a formula in which the score is taken to an exponent which is increased with each iteration.

16. A machine translation system comprising
memory for storing a set of source sentences, each of the source sentences comprising source words in a source language, and a set of predefined operators;
memory storing instructions for:
for each source sentence, generating a target sentence comprising target words in a target language which are translations of the source words;
after generating the target sentence, generating a plurality of translation neighbors of the target sentence, each translation neighbor comprising at least some of the target words of the target sentence, the translation neighbors being generated by changing the target sentence using the set of predefined operators, each operator designed to perturb the target sentence;
for each of the plurality of translation neighbors, computing a phrase alignment between the source sentence and the translation neighbor;
scoring each translation neighbor with a translation scoring model, based on the computed phrase alignment between the source sentence and the translation neighbor;
ranking a plurality of the translation neighbors based on the translation model scores;
if the source sentences are being used for training the model, updating parameters of the model based on a comparison of the translation model score-based ranking with an external ranking of the plurality of translation neighbors;
iterating, at least once more, the generating of translation neighbors, scoring, ranking, and, in the case of training, updating the parameters, wherein in the generating of the plurality of translation neighbors of the target sentence, the target sentence is a translation neighbor from a prior iteration; and
if the source sentence is received for decoding, outputting a translation neighbor as a translation of the source sentence;
if the source sentence is received for training, storing the trained model generated in one of the iterations in memory; and
a processor in communication with the memory for executing the instructions.

17. The system of claim 16, further comprising a biphrase table stored in memory accessible to the processor from which biphrases are drawn for computing the phrase alignment and generating the target sentence.

18. A method for machine translation comprising:
receiving text to be translated comprising at least one source sentence each of the source sentences comprising source words in a source language;
for each of the at least one source sentence, generating a target sentence comprising target words in a target language which are translations of the source words;
after generating the target sentence, generating a plurality of translation neighbors of the target sentence, the translation neighbors being sentences generated by changing the target sentence using a set of predefined operators, each operator designed to perturb the target sentence, each translation neighbor comprising at least some of the target words of the target sentence, words of the target sentence each being given a position number which is the order of the words in the target sentence, each of a plurality of the operators being applied to each of the position numbers;
for each of the plurality of translation neighbors, computing a phrase alignment between the source sentence and the translation neighbor;
scoring each translation neighbor with a translation scoring model, based on the computed phrase alignment between the source sentence and the translation neighbor;
ranking a plurality of the translation neighbors based on the translation model scores;
iterating, at least once more, the generating of translation neighbors, scoring, and ranking, wherein in the generating of the plurality of translation neighbors of the target sentence, the target sentence is a translation neighbor from a prior iteration selected based on the ranking; and
outputting one of the translation neighbors as a translation of the source sentence based on the ranking,
wherein at least one of the generating of translation neighbors, scoring, ranking, and outputting is performed with a computer processor.

19. The method of claim 18, wherein the computing of the phrase alignment between the source sentence and the translation neighbor comprises identifying a set of biphrases which cover, at best, all source words of the source sentence and all target words of the translation neighbor, each biphrase in the set including a sequence of the source words and a sequence of the target words, and wherein in the phrase alignment, each source word and each target word is covered by no more than one of the biphrases except in the case of consistent overlapping biphrases which cover both a same target word and a same source word.

20. A computer program product comprising non-transitory media encoding instructions which when executed by a computer, perform the method of claim 18.

21. A machine translation system comprising:
memory for storing a set of source sentences, each of the source sentences comprising source words in a source language;
memory storing instructions for:
- for each source sentence, with a trained translation scoring model, generating a target sentence comprising target words in a target language which are translations of each of the source words;
- after generating the target sentence, in a first iteration, generating a plurality of translation neighbors of the target sentence, each translation neighbor comprising at least some of the target words of the target sentence, the translation neighbors being generated by changing the target sentence according to each of a set of predefined operators;
- for each of the plurality of translation neighbors, computing a phrase alignment between the source sentence and the translation neighbor;
- scoring each translation neighbor with a translation scoring model, based on the computed phrase alignment between the source sentence and the translation neighbor;
- ranking a plurality of the translation neighbors based on the translation model scores;
- if the source sentences are being used for training the model, updating parameters of the model based on a comparison of the translation model score-based ranking with an external ranking of the plurality of translation neighbors;
- iterating, at least once, the generating of translation neighbors using the same set of predefined operators, scoring, ranking, and, in the case of training, updating the parameters, wherein in the generating of the plurality of translation neighbors of the target sentence, the target sentence is a translation neighbor from a prior iteration; and
- if the source sentence is received for decoding, outputting a translation neighbor as a translation of the source sentence;
- if the source sentence is received for training, storing the trained model generated in one of the iterations in memory; and a processor in communication with the memory for executing the instructions.

22. The system of claim 21, further comprising the set of operators, each operator designed to perturb the target sentence for generating the plurality of translation neighbors of the target sentence.

23. The method of claim 21, wherein the computing of the phrase alignment between the source sentence and the translation neighbor uses biphrases identified from a biphrase table, the identified biphrases each including a source phrase that includes a span of one or more of the source words in the source sentence and a target phrase that includes a span of one or more target words in the translation neighbor, wherein in the phrase alignment, consistent overlapping biphrases are permitted, whereby each source word and each target word is covered by no more than one of the biphrases or by consistent overlapping biphrases, each of the consistent overlapping biphrases being an identified biphrase which covers a same target word and a same source word as the other consistent overlapping biphrase in the phrase alignment.

* * * * *